United States Patent [19]

Shelton et al.

[11] 3,752,376

[45] Aug. 14, 1973

[54] AUTOMOTIVE VEHICLE SUPPORTING MEANS FOR CAMERAS

[76] Inventors: Forest G. Shelton, 10421 Thorpe Ave., Overland, Mo. 63114; Robert L. Woodruff, 435 Ryan Dr., Florissant, Mo. 63031; Homer W. Shelton, 9970 Page Blvd., Overland, Mo. 63114

[22] Filed: July 29, 1971

[21] Appl. No.: 167,233

[52] U.S. Cl. ........... 224/42.45 B, 248/205 R, 95/86
[51] Int. Cl. ............................................. B60r 11/04
[58] Field of Search ................. 224/42.44, 42.45 B, 224/42.43, 29 R, 29 D, 42.42 R, 42.42 B; 95/86; 108/46, 44; 248/205 R; 297/188, 191

[56] References Cited
UNITED STATES PATENTS

| 2,804,278 | 8/1957 | Jewett .............................. 95/86 X |
| 2,825,611 | 3/1958 | Aynesworth ................. 224/42.44 X |
| 2,603,134 | 7/1952 | Burnam .................................. 95/86 |
| 3,477,586 | 11/1969 | Haluska .......................... 297/188 X |

Primary Examiner—Gerald M. Forlenza
Assistant Examiner—Kenneth Noland
Attorney—Kimmel, Crowell & Weaver

[57] ABSTRACT

A bracket for mounting camera means in an adjusted position intermediate the dashboard of an automotive vehicle and the back of the front seat thereof.

11 Claims, 7 Drawing Figures

Patented Aug. 14, 1973
3,752,376
2 Sheets-Sheet 1
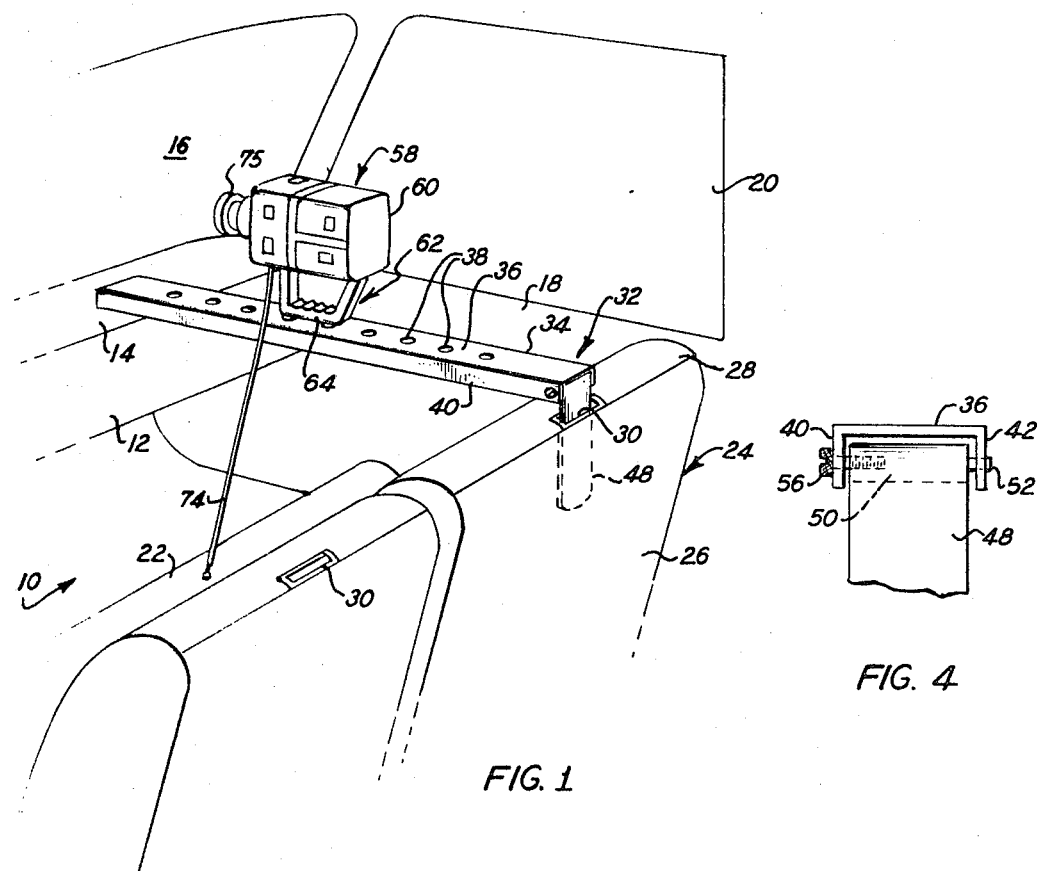
FIG. 1
FIG. 4
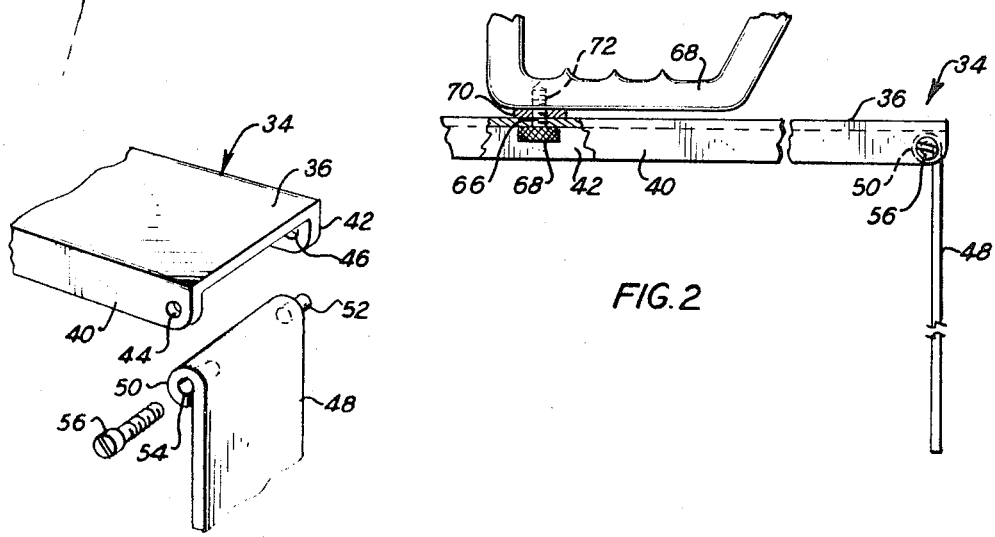
FIG. 2
FIG. 3
INVENTORS
FOREST G. SHELTON
ROBERT L. WOODRUFF
HOMER W. SHELTON
BY
Kimmel, Crowell & Weaver
ATTORNEYS Patented Aug. 14, 1973
3,752,376
2 Sheets-Sheet 2
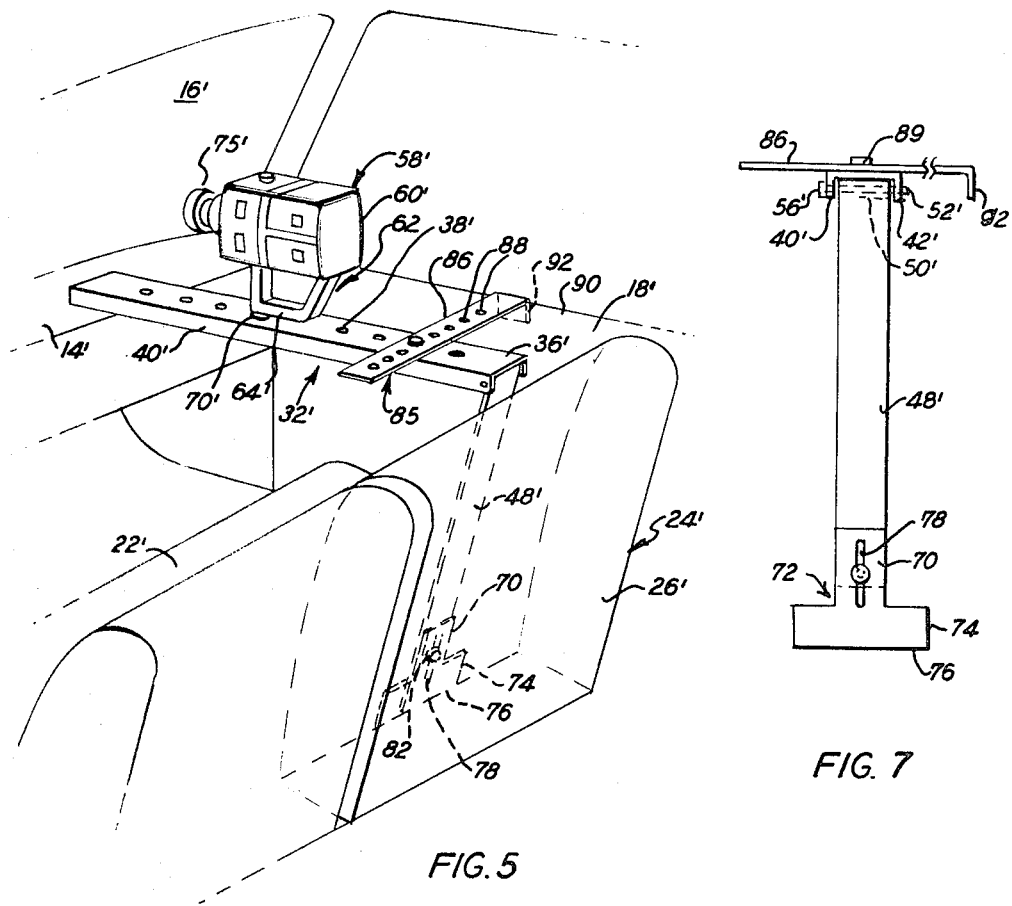
FIG. 5
FIG. 7
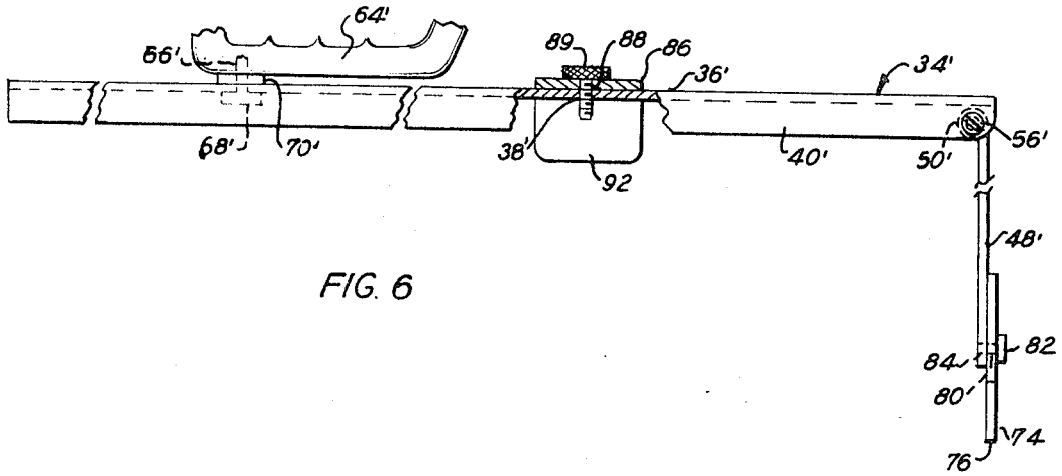
FIG. 6
INVENTORS
FOREST G. SHELTON
ROBERT L. WOODRUFF
HOMER W. SHELTON
BY
Kimmel, Crowell & Weaver
ATTORNEYS

AUTOMOTIVE VEHICLE SUPPORTING MEANS FOR CAMERAS

BACKGROUND OF THE INVENTION

1. Field of the Invention

It is believed that the subject matter of this invention would be properly classifiable by the United States Patent Office in Class 95, entitled "PHOTOGRAPHY," and its Subclass 86, entitled "CAMERA SUPPORTS."

2. Description of the Prior Art

Automobile camera supporting means, stands or brackets are not, per se, new in the art. This is evidenced by the disclosures of the U.S. Pat. to Jewell and McDonald, Nos. 2,804,278 and 2,907,253, respectively. However, it is submitted that the simplicity of the disclosure of the instant invention serves to patentably distinguish over the more complicated structures of the named patentees, and to so radically depart from their teachings as to constitute invention.

SUMMARY OF THE INVENTION

Basically, the instant invention relates to a normally horizontal support member for camera means and wherein the support member extends between the back rest of the front seat of an automotive vehicle and its dashboard in order to hold the lens system of the camera in an elevated position to obtain photographic images through the front windshield. The apparatus involved herein will become more manifest from a consideration of the following specification when read in the light of the annexed drawings.

BRIEF DESCRIPTION OF THE DRAWINGS

FIG. 1 is a fragmentary perspective view of the front compartment of a conventional automotive vehicle, this Figure illustrating a camera supporting means constructed according to one embodiment of this invention;

FIG. 2 is a fragmentary side elevational view of the means shown in FIG. 1;

FIG. 3 is a fragmentary exploded perspective view of the normally horizontal camera support member and its pivotal adjustment means for connection with the back rest of the front seat of the automotive vehicle;

FIG. 4 is a rear elevational view of the means shown in FIG. 3;

FIG. 5 is a fragmentary perspective view, similar to FIG. 1, this Figure illustrating a modified form of the camera supporting means constructed in accordance with this invention;

FIG. 6 is a fragmentary side elevational view of the supporting means shown in FIG. 5, this view being partly broken away to illustrate certain mechanical constructions; and FIG. 7 is a rear elevational view of the supporting means shown in FIG. 6.

DESCRIPTION OF THE PREFERRED EMBODIMENTS

In the first of the preferred embodiments illustrated in FIGS. 1 to 4, inclusive, reference numeral 10 generally designates the front compartment of a conventional automotive vehicle having the usual front dashboard 12 which includes a lateral top end 14 above which upwardly projects a conventional windshield 16. At 18 is designated one of the two laterally opposed doors, each of which is provided with the customary windowpane 20.

Reference numeral 22 indicates the seat cushion of the usual front seat 24, the seat 24 including an upright back rest 26 having an upper end 28. The upper end 28 is formed with a pair of downwardly opening channels 30 which normally receive the tongues (not shown) of a pair of head rests (also not shown).

All of the above description relates to conventional automobile construction and, per se, does not constitute the gist of the instant invention.

The specific embodiments of the instant invention are set forth immediately below.

In the first embodiment of this invention a camera bracket or support means is denoted, in general, by reference numeral 32.

The support means 32 includes an elongated downwardly opening substantially U-shaped channel member 34 having a central bight 36 in which is formed a plurality of longitudinally spaced transversely extending tapped openings 38. Depending downwardly from the opposed longitudinally extending marginal edges of the bight 36, in laterally spaced and substantially parallel relationship, are side flanges 40, 42.

As is seen in FIG. 1, the flanges 40, 42 at the leading end of the channel member 34 are superimposed on the dashboard top end 14 while their respective trailing ends extend over the upper end 28 of the back rest 26. The trailing ends of the flanges 40, 42 are formed with confronting aligned transversely extending openings 44, 46, respectively, to serve a function to be described.

At 48 is indicated an elongated substantially flat rectangular plate having a substantially cylindrical bead 50 at its upper end. From one side of the bead 50 laterally projects a pin 52, and at its other side, and aligned with the pin 52, is a hollow cylindrical pocket 54. The pin 52 is adapted to be pivotally received within the opening 46 and the pocket 54 is aligned with the opening 44.

Inserted through the opening 44 for reception in the pocket 54 is a self tapping screw 56. The pin 54 and the screw 56 hold the channel member 32 and the plate 48 in connected assembly and in such a manner that when the plate 48 is received in the channel 30 at the right-hand side (the passenger side) of the vehicle, the channel member 32 spans between the top end 14 of the dashboard 12 and the upper end 28 of the back rest 26.

Reference numeral 58 denotes a conventional camera which, in the drawings, is illustrated as having a main body portion 60 and a downwardly depending U-shaped handle means 62. The handle means 62 includes a bight 64 adapted for juxtaposition over the bight 36. The camera 58 is adjusted longitudinally of the bight 36 until a desired position is achieved, and thereafter a screw 66 having an enlarged finger-engageable knurled head is threaded through one of the openings 38, the screw passing through the annular washer 70 and being threadedly received in a tapped opening 72 formed in the lower side of the handle bight 64. A manually operable control cable 74 extends from the camera 58 into the proximity of the driver's or the left-hand seat position of the front seat.

It will be here recognized that by virtue of the screw connecting means, the lens system 75 and the camera 58 may be turned to any desired angle about the upright axis of the screw 66 and may be releasably secured in such position thereby.

In FIGS. 5 to 7, inclusive, there is illustrated the details of a second embodiment of this invention. Since certain components of the second embodiment of this invention have counterparts in the first embodiment described and illustrated herein, the same reference numerals have been applied in each instance, but in the case of the second embodiment, a prime mark has been added thereto in order to provide differentiation means.

Thus, and in the second embodiment, the bight 36' of the downwardly opening channel member 34' is formed with the longitudinally spaced transverse openings 38' and, as before, the bight 36' carries the laterally spaced and confronting depending flanges 40'42' at each, respectively, longitudinally extending marginal edge. The leading ends of the edges of the flanges 40', 42' are, as before, supported on the top end 14' of the front dashboard 12' adjacent the front windshield 16'. The plate 48', in this instance, is elongated and as before terminates in a bead 50' at its upper end, the latter being inserted between and connected to the trailing ends of the flanges 40', 42' by the pin 52' and screw 56'.

The plate 48' depends from the support means 32', and superimposed against one side thereof adjacent its lower end is the stem 70 of an inverted substantially T-shaped base plate 72 having a cross-head 74 provided with a normally horizontal lower end edge 76. The stem 70 is formed with a longitudinally extending slot 78 through which extends the shank 80 of a securing bolt 82 which is threaded into a suitable tapped opening 84 formed in the lower end of the plate 48'. The slot 78 and bolt 82 afford means for adjusting the base plate 72 relative to the longitudinal axis of the plate 48' and for holding the same in its adjusted position.

Normally, the plate 48' bears against the forward or front side of the back rest 26' with the edge 76 being superimposed on the cushion 22' adjacent its junction with the back rest 26'. The base support 72 will, of course, be adjusted so that the support means 32' is horizontal or is positioned at a desired angle inclined to a horizontal plane. This provides for a vertical adjusting means for the lens system 75' which cannot be achieved in the above-described first embodiment of this invention.

To prevent the lateral shifting of the support means 32' this second embodiment of the invention provides a lateral substantially L-shaped brace 85 having a normally substantially horizontal elongated flat rectangular leg portion 86 formed with a plurality of longitudinally spaced transversely extending openings 88 adapted for selective alignment, respectively, with one of the tapped openings 38'.

As is seen in FIG. 5, one end of the leg portion 86 spans over the upper end of the sill 90 of the side door 18' and terminates in a downwardly projecting foot section 92 (see FIGS. 5 and 6) which is interposed between the sill 90 and its associated windowpane 20'.

The camera 58' is connected by its handle means 62' on the support means 32' in the same manner as heretofore described, that is, by the screw 66', washer 70', and a selected one of the tapped openings 38'. Thus, and in this second embodiment of the invention, there is provided means for adjustably supporting a camera device in an automotive vehicle wherein the camera may be vertically adjusted or horizontally adjusted and secured about the shaft of its connecting screw 66'.

From the foregoing it can be seen that the backs of the channel members 34 and 34' are respectively supported on back supports for swinging movement about the horizontal axes of the pins 52 and 52', these axes being at substantially right angles to the longitudinal forward-rearward axis of the channel members. The fronts of the channel members 34 and 34' are respectively supported on front supports solely by gravity on the tops 14 and 14' of the dashboards. The cameras 58 and 58' are respectively connected to the channel members 34 and 34' between the back and front supports so that their focal axes respectively extend toward the windshields for proper viewing through the windshields. The channel members 34 and 34' (and the cameras 58 and 58') may swing vertically about pins 52 and 52'.

Having described and illustrated two embodiments of this invention in detail, it will be understood that the same are offered merely by way of example, and that the scope of this invention is to be limited only by way of the appended claims.

What is claimed is:

1. An automotive vehicle supporting means for cameras wherein said vehicle includes a dashboard having a lateral top end disposed rearwardly of and in juxtaposition to the lower end of a normally upright windshield for said vehicle, and seat means in said vehicle spaced rearwardly of said dashboard, said supporting means comprising:

an elongated member having a pair of opposed leading and trailing ends;
   said leading end being supported solely by gravity on the top end of said dashboard to thereby constitute a front support for said leading end;
   a back support for connection on said seat means that includes pivot means on said trailing end, said pivot means having a prone axis that extends substantially at right angles to the direction of elongation of said member, said direction of elongation extending in a forward-rearward direction between said front support and said back support; and
   means for connecting said camera on a mid-portion of said member between said back support and said front support so that the camera focal axis is directed toward the windshield.

2. Camera supporting as defined in claim 1 and:
   means for selectively adjusting and securing said camera in the direction of the elongation of said member.

3. Camera supporting means as defined in claim 2 wherein said seat means includes a normally upright back rest and:
   said back support includes means for connecting said member on said back rest.

4. Camera supporting means as defined in claim 3 wherein:
   said back rest has an upper end provided with a downwardly opening channel;
   said back support includes a tongue having an end connected on the trailing end of said member by said pivot means; and
   an opposed end detachably received within said channel.

5. Camera supporting means as defined in claim 4 wherein said member comprises:
   an elongated downwardly opening substantially U-shaped channel member having a bight and a depending flange at each longitudinally extending marginal edge thereof;

said flanges being disposed in laterally spaced, confronting and substantially parallel relationship relative to one another and extending to the leading and trailing ends of said bight;

the leading ends of said flanges being engaged over said top end of said dashboard to constitute said front support and the trailing ends thereof being supported on the upper end of said back rest adjacent said channel; and wherein said pivot means comprises means for pivotally connecting said connected end of said tongue on said flanges.

6. Camera supporting means as defined in claim 2 wherein:

said member comprises a downwardly opening U-shaped channel member having an elongated bight and a depending flange at each longitudinally extending marginal edge thereof, said seat means includes a seat cushion and a back rest;

said flanges being disposed in laterally spaced, confronting and substantially parallel relationship to one another and extending to the leading and trailing ends of said bight;

the leading ends of said flanges being engaged over said top end of said dashboard to constitute said front support and the trailing end of said flanges terminating adjacent said back rest; and means connected with said pivot means and engaging said cushion and back rest to hold said trailing end in an elevated position.

7. Camera supporting means as defined in claim 6 wherein:

said engaging means comprises an elongated tongue having an end pivotally connected between said flanges adjacent the trailing ends thereof to constitute said pivot means; and an opposed end engaging said cushion and back rest.

8. Camera supporting means as defined in claim 7 wherein:

said opposed end includes an inverted T-shaped member having a crosshead engageable with said cushion.

9. Camera supporting means as defined in claim 8 wherein:

said T-shaped member includes a stem; and means extending through said stem for adjustably securing said T-shaped member on said opposed end of said tongue.

10. Camera supporting means as defined in claim 9 wherein:

said automotive vehicle includes a door having a windowsill, said door being positioned laterally to one side of said seat means, and wherein:

brace means extends between and is connected on said member and said sill.

11. Camera supporting means as defined in claim 10 and:

means releasably connecting said brace means in preselected positions on said member and sill.

* * * * *